United States Patent [19]

Schlienger

[11] 4,288,116
[45] Sep. 8, 1981

[54] APPARATUS FOR FASTENING FLANGED TUBULAR MEMBERS

[75] Inventor: Max P. Schlienger, Ukiah, Calif.

[73] Assignee: Retech, Inc., Ukiah, Calif.

[21] Appl. No.: 31,892

[22] Filed: Apr. 20, 1979

[51] Int. Cl.³ .............................................. F16L 17/00
[52] U.S. Cl. ............................... 285/364; 292/256.65; 292/257; 285/39; 285/421
[58] Field of Search ............... 285/364, 365, 406, 366, 285/408, 367, DIG. 2, 308, 309, 310, 394, 358, 421, 94, 39; 292/256.6, 256.65, 257

[56] References Cited

U.S. PATENT DOCUMENTS

| | | | |
|---|---|---|---|
| 2,095,037 | 10/1937 | Reintjes | 292/257 |
| 2,441,754 | 5/1948 | Cobi | 285/358 X |
| 2,996,318 | 8/1961 | Gravert | 285/364 X |
| 3,627,358 | 12/1971 | Polston | 285/406 |

Primary Examiner—Dave W. Arola
Attorney, Agent, or Firm—Townsend and Townsend

[57] ABSTRACT

A method and apparatus for aligning and fastening open ended tubular members, such as pipes, tanks, and other cylindrically shaped fluid enclosures, which have radially outwardly protruding flanges extending around the circumference of the open ends. The flanges have flat mating faces and tapered back sides defining conical surfaces which converge radially outwardly when the flanges of two tubular members are abutted. The fastening device comprises a ring, a plurality of rotatable and radially movable clamping spools retained on the ring, and a like plurality of bolts on the ring for moving the clamping spools radially inward. The rotatable clamping spools have a cylindrical shank and rim segments at the shank ends which extend around only a portion of the shank circumference. The rim segments, which define opposing clamping faces, are dimensioned so as to accommodate the shape of the flange back sides and to apply axial clamping forces to the mated flanges when the spools are forced radially inward by the bolts. Any three generally equally spaced apart clamping spools may be rotated so their respective rim segments point radially outward and may then be forced radially inward so that the shanks of the three spools initially axially align the abutted flanges prior to clamping.

35 Claims, 10 Drawing Figures

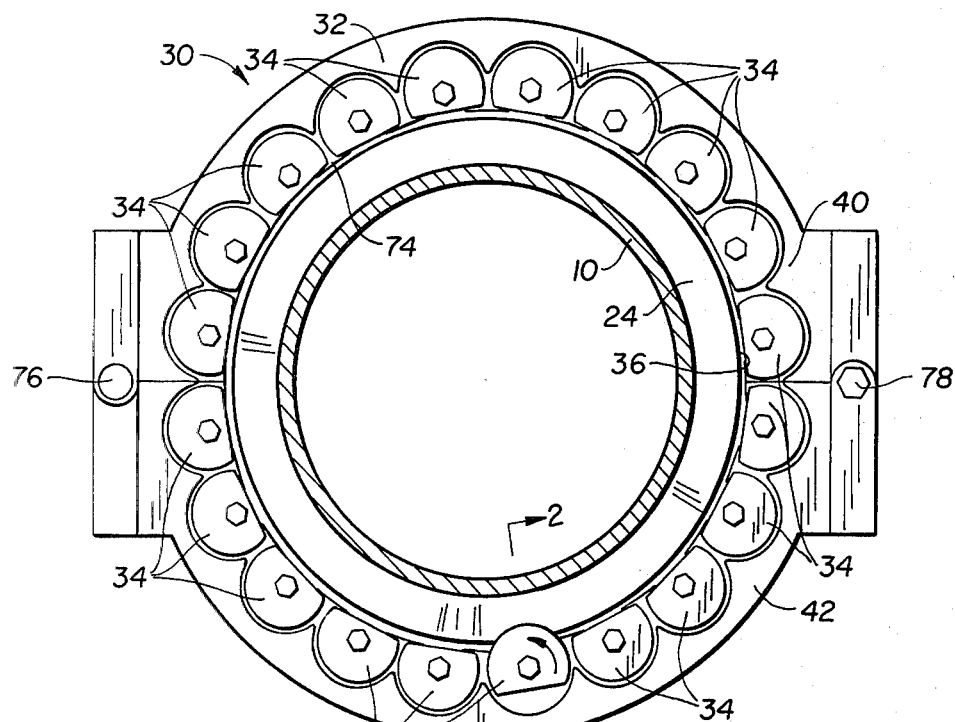
FIG._1.
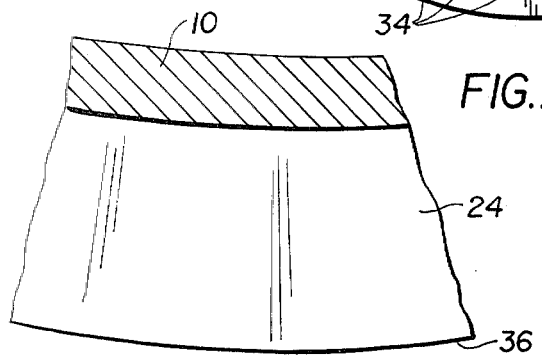
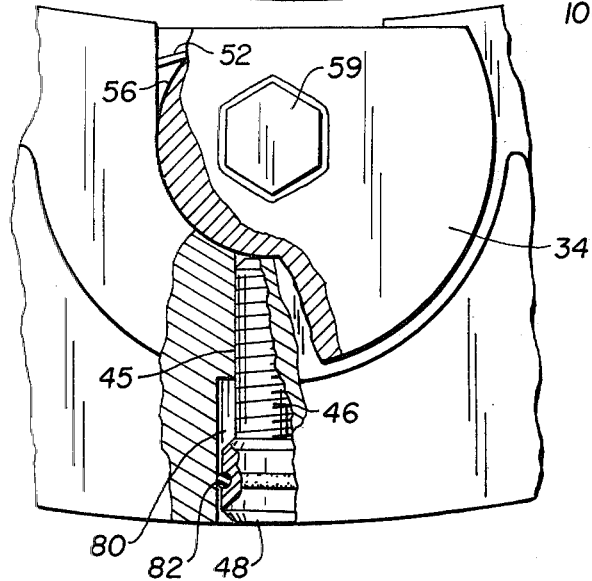
FIG._4.
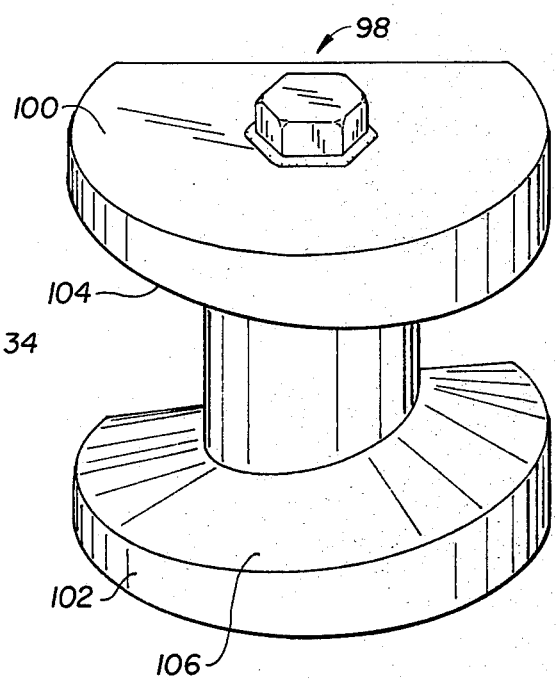
FIG._6.

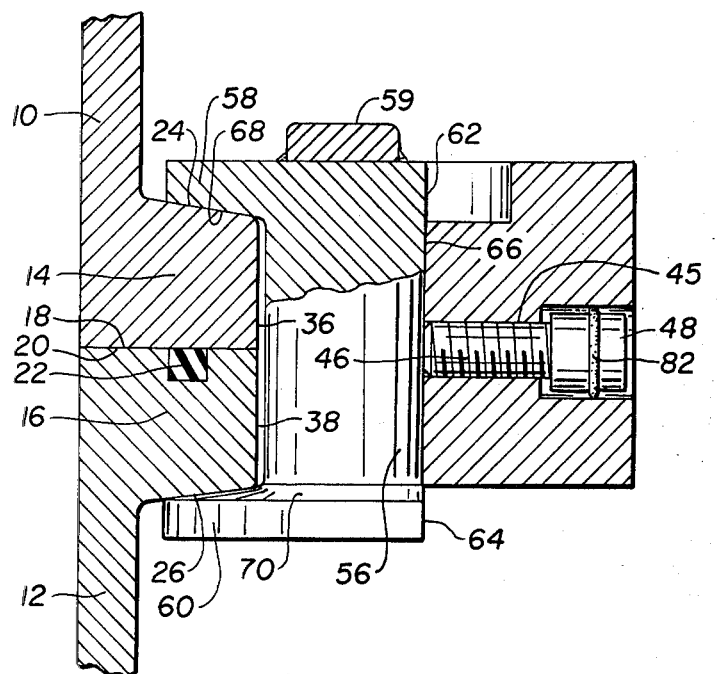
FIG._2.
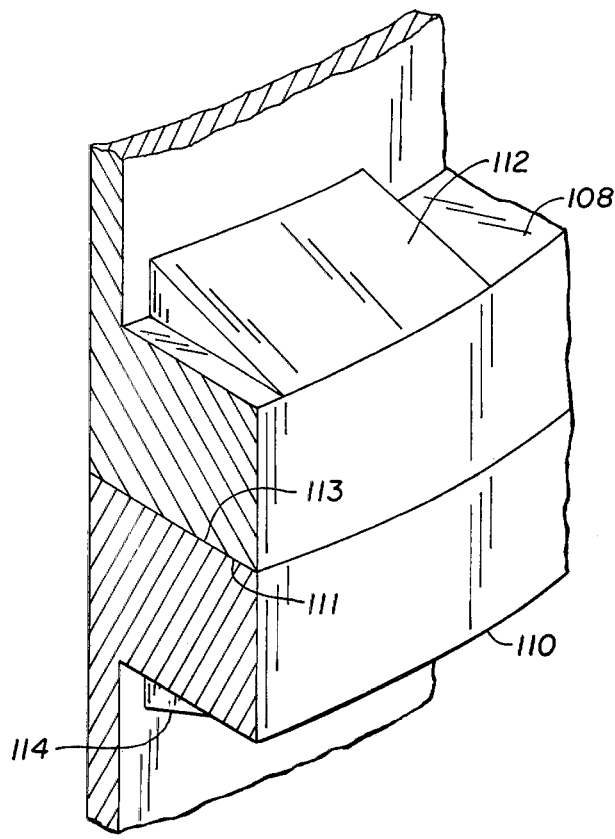
FIG._8.
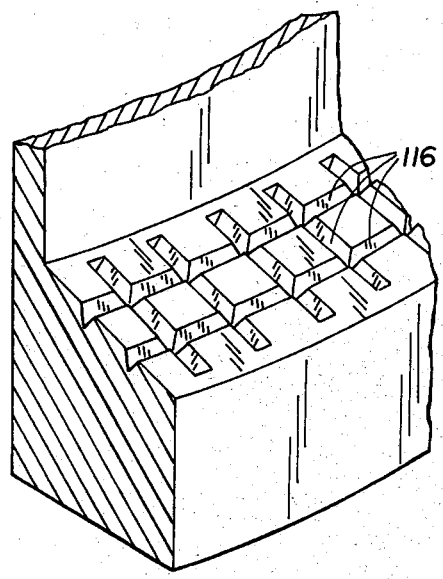
FIG._7.

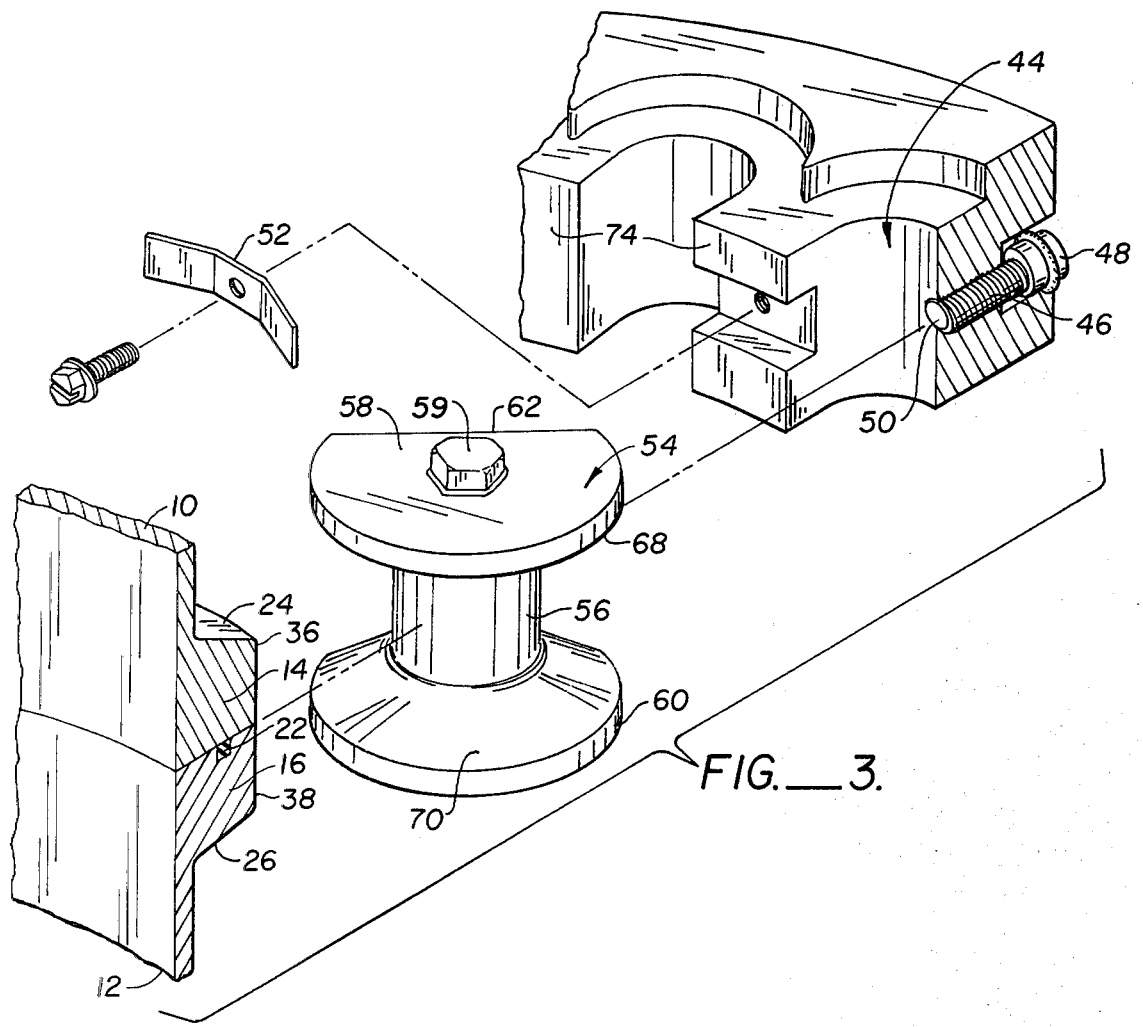
FIG._3.
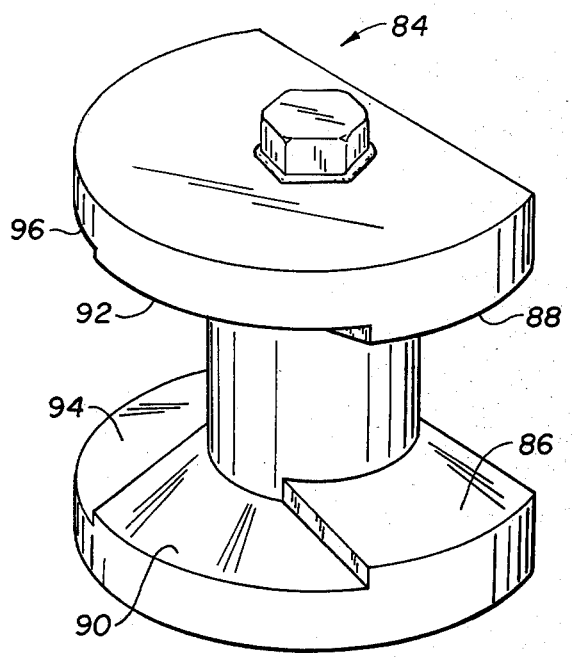
FIG._5.

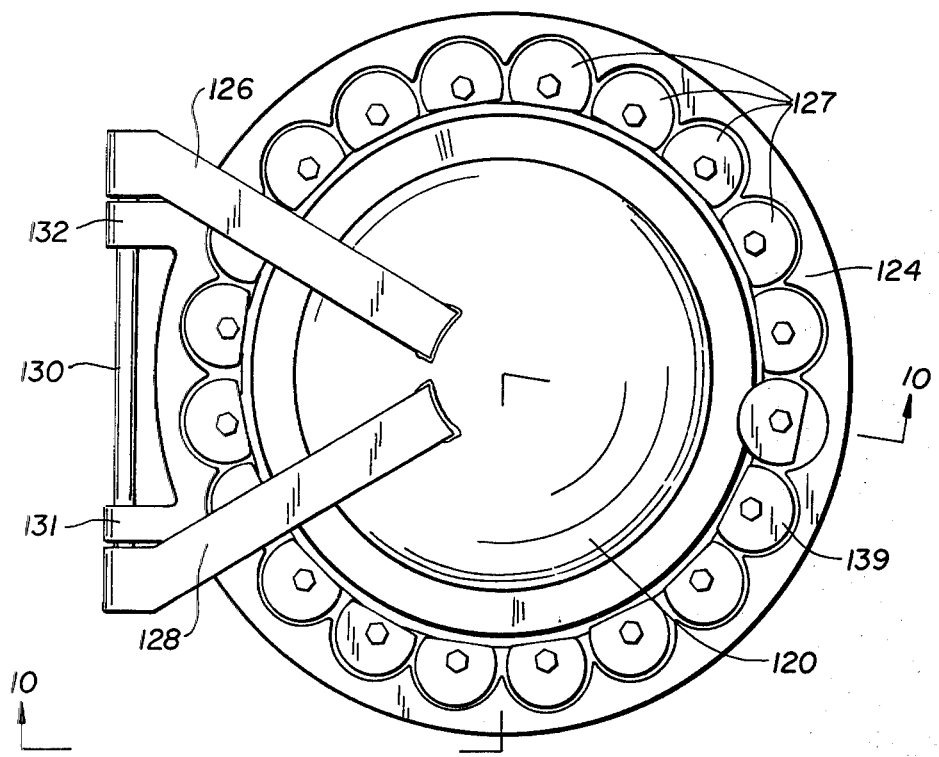
FIG._9.
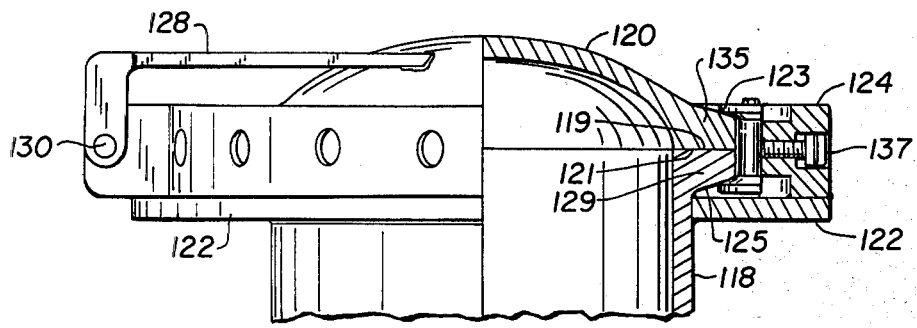
FIG._10.

APPARATUS FOR FASTENING FLANGED TUBULAR MEMBERS

BACKGROUND OF THE INVENTION

This invention relates to closure devices and fastening means for pipes, tanks and various other tubular shaped fluid enclosures, which are generally subjected to high internal pressure.

A common device for fastening such tubular members to one another empolys a plurality of bolts which pass through radially extending flat flanges provided on the ends of the tubular members. One problem inherent in such a device is that it is often difficult to accurately align the end flanges with one another in order that the bolts may be placed through the holes. This problem is accentuated when relatively heavy tubular members, such as pipeline segments, are required to be secured to one another. A further disadvantage of the use of bolts to secure the flat end flanges is that due to the diameter of the bolt head and the need for engaging the bolt heads with wrenches that fit over them the flanges must extend a considerable distance from the pipe or vessel wall. Consequently, the axial forces produced by the bolts are applied at a substantial distance from the pipe or vessel wall, thereby resulting in bending moments and adverse stresses about the ends of the pipe or vessel segments.

Most recently, tubular members have been secured to one another with radially protruding, tapered end flanges extending around the circumference of the open ends of the tubular members. Like the flat flanges, these flanges also have flat mating faces. However, the back sides of the flanges are tapered, i.e. they define a conical surface which diverges in a radially outward direction towards the open end of the tubular member. Thus when the mating faces of two pipes or vessels are abutted against one another, the backs of the mated flanges converge radially outwardly from the pipes or vessels. A yoke or split ring device having a groove shaped so as to generally match the mated flanges is then used to clamp the pipe or vessel segments together. The split ring comprises two semi-circular segments. The two segments of the ring are placed over the mated flanges and the ends of the two ring segments are secured together with bolts which are oriented tangentially to the completed ring. As the bolts are tightened the grooves of the ring apply axial clamping forces to the tapered back sides of the mated flanges. A split ring fastening device of this type is described in U.S. Pat. No. 3,077,360.

Although such an arrangement is a substantial improvement over the earlier discussed bolted flange connection, it has several disadvantages. The flanges are difficult to align, especially when the pipe or vessel segments are heavy, e.g. when the segments are adapted for high pressure application. Because the flanges are machined in various sizes and shapes, a separate split ring is required to accommodate each specific flange size. Additionally, the tapered back sides of the flanges have various irregularities around their circumference either because of normal machining tolerances or because of galling and wear caused by frequent use. Accordingly, the axial thickness of the mated flanges may vary considerably around the circumference. Thus when the split ring segments are attached and bolted together, the axial clamping forces are not always equally distributed around the circumference of the mated flanges and adverse bending moments and stresses result. A further disadvantage of the split ring connection occurs because the ring normally contacts the flanges around the entire circumference, and thus the ring is often extremely difficult to remove because of rust or corrosion which may have developed after exposure to the atmosphere for an extended time period.

SUMMARY OF THE INVENTION

The present invention provides a method and apparatus for fastening generally open ended tubular members, such as pipes, tanks and vessels, which eliminates at least some of the disadvantages inherent in prior art connectors.

The tubular members which are fastened together by the invention include pipes, tanks, pressure vessels, cover plates and any type of cylindrically shaped fluid enclosure which is open ended and has a radially outwardly protruding flange extending around its open end. These types of tubular members, hereinafter collectively referred to as "pipes", are fastened to one another at their respective open ends by applying axial forces to these protruding flanges so that the pipes are thus held together at their open ends.

A typical flange is either rigidly secured to the open end of the pipe, as by a weld, or is an integral part of the pipe, and extends radially outward from the pipe wall over the entire pipe circumference. The flange has a flat mating face oriented axially outward from the open pipe end for abutting with a corresponding mating face of another pipe and a back side pointing generally in the opposite direction of the mating face. The back side is either flat and thus generally parallel with the mating face, or, preferably, it is tapered so as to define a conical surface which diverges radially outward in the direction of the open pipe end. The flange has a radially outermost periphery which is between the mating face and back side and which defines the axial thickness of the flange.

The present invention provides a connector for two pipes of the above discussed type and specifically of the type having flanges with tapered back sides. The connector comprises a ring having an inner diameter greater than the outer diameter of the peripheries of the flanges. The open ends of the two pipes are brought together so that the mating faces of their respective flanges abut. The ring is placed over the mated pipes and axially aligned with the plane of the abutted mating faces of the flanges. Provided on the ring and spaced circumferentially around the ring are a plurality of rotatable clamping members which are movable in a radial direction. A plurality of radially oriented bolts, each associated with a respective clamping member, are also provided on the ring, and serve to move the clamping members radially inward.

Each of the clamping members is normally defined by a rotatable spool which has a generally cylindrical central shank or hub and rims on the ends of the central shank. The rims define at least one pair of opposing clamping faces which diverge outwardly from the shank at generally the same angle at which the tapered back sides of the flanges diverge from the wall of the pipe. Further, the distance between the opposing clamping faces is sufficient to permit the rims of the spool to overlap the back sides of the mated flanges. The rims extend around only a portion of the circumference of the shank. Thus, that portion of the rim perimeters which do not have clamping faces essentially define planar surfaces which are tangential to the shank. At the point of tangency, the shank effectively extends the entire axial length of the spool.

After the ring is placed over the pipes whose open ends are abutted, any three of the spools, selected at approximately 120 degree increments around the ring so as to define a generally triangular pattern, are rotated so that the clamping faces are oriented radially outward. These three spools are then moved radially inward by tightening their respective bolts so that the shanks force the two flange peripheries and thereby the two pipes to axially align with one another.

The remaining spools are then rotated so that a proper sized pair of clamping faces, selected to accommodate the particular size of flanges, is oriented radially inward. These remaining spools are then moved radially inward by tightening their respective bolts. Tightening the bolts moves the spools towards the mated flanges so that the clamping faces on the spools overlap the back sides of the mated flanges. Once the clamping faces overlap the back sides of the mated flanges, an additional radial force is applied by further tightening the bolts. These radial forces applied to the spools are transferred from the clamping faces of the spools to the back sides of the flanges. Because the back sides of the mated flanges are tapered so that they converge radially outward, the radial forces applied by the bolts to the clamping faces of the spools are translated into axial forces which clamp the pipe ends together.

The first three spools used to axially align the pipes are withdrawn radially outward by loosening their respective bolts. These three spools are rotated so that the proper sized pair of clamping faces are oriented radially inward and the three spools are then moved radially inward by their respective bolts in the manner discussed, thereby completing the pipe connecting process.

When the connector is to be used to clamp pipes having flanges with flat back sides, wedge segments are secured to the flat back sides to thereby convert them into tapered back sides.

Irregularities in flange thickness because of galling or machining tolerances do not create a problem with the present invention since each of the spools is independently movable in a radial direction. Thus for example, if the flanges are irregularly thin at a point where a particular pair of clamping faces overlaps the flanges the spool is merely moved further inward with an additional radial force until the clamping faces apply sufficient axial clamping forces to the back sides of the mated flanges.

Furthermore, since the total bearing surface contacting the flanges is relatively minimal with the present invention, as compared to the prior art split ring, there is much less likelihood that the clamping faces will become stuck to the back sides of the flanges by rust or corrosion. To further alleviate this problem, the spools are constructed of corrosion resistant material and grooves are cut on the back sides of the flanges to define a "waffle" pattern of depressions in which lubricating grease may be stored. The durability and strength of the connector are increased by constructing the spools of high strength material, such as carbon steel.

It should be apparent that the present invention provides a connector for pipes which not only securely clamps open ended pipes to one another, but also conveniently axially aligns those pipes prior to fastening. The invention provides a fastening device which is capable of accommodating various sizes and shapes of flanges as well as flanges having surface irregularities. The present invention provides a fastening means which may be quickly disconnected, even after exposure to the atmosphere for an extended time period.

The novel features which are believed to be characteristic of the invention, together with objects and advantages thereof, will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is an end view showing the connector and one of the pipes.

FIG. 2 is a sectional view of the mated pipe flanges and one of the clamping spools of FIG. 1.

FIG. 3 is an exploded view of the mated flanges and clamping spool shown in FIG. 2.

FIG. 4 is a partial sectional view of one clamping spool and its associated bolt.

FIG. 5 is a view of a clamping spool having sectored clamping faces.

FIG. 6 is a veiw of a tapered clamping spool.

FIG. 7 is a view of the lubricant-retaining depressions on the back side of a flange.

FIG. 8 is a view of mated flat flanges and associated wedge segments.

FIG. 9 is an end view of the fastening device for a tank cover.

FIG. 10 is a side partial sectional view of the fastening device depicted in FIG. 9.

DESCRIPTION OF THE PREFERRED EMBODIMENTS

Referring first to FIGS. 1 and 2, two pipes 10 and 12 to be secured and sealed to each other are fitted with circumferential end flanges 14 and 16 which have flat mating surfaces 18 and 20, one of which may include an "O" ring 22 for sealing the flanges to each other. Back sides 24 and 26 of the flanges face away from each other and are tapered so that they converge in a radially outward direction, normally in the plane of the mating faces 18 and 20. Thus, the back sides of the flanges define conical surfaces. The flanges and therewith the pipes are secured to each other in accordance with the present invention with connector 30 defined by a ring 32 having an inner diameter which exceeds the outer diameter of flanges 14 and 16 and which is placed thereover. Attached to an inside of the ring are a multiplicity of clamping spools 34 which are disposed between the peripheries 36 and 38 of pipe flanges 14 and 16 and the ring. Each spool is defined by a generally cylindrical shank 56 and pair of spaced apart rims 58 and 60 which protrude radially from the shank. The rims define opposing clamping faces 68 and 70 which have a taper complementary to that of the pipe flange back sides 24 and 26.

In use, the ring together with the spools retained thereto is placed over the flanges 14 and 16 so that the tapered clamping faces 68 and 70 of the spools are disposed radially outward of the flange peripheries 36 and 38. Thereafter the spools are moved so that the tapered clamping faces overlap the tapered flange back sides 24 and 26 until the clamping faces and the flange back sides are in mutual engagement. Additional radially inward acting forces are applied to each spool which generate axial force components between the clamping faces and the flange back sides 24 and 26 which bias the flanges and force the pipes towards each other to secure the flange mating faces 18 and 20 and establish a seal therebetween. A sufficient radial force is applied to each of the spools until the combined generated axial force exceeds the force generated by the pressure within the enclosure.

Referring now to FIGS. 1 through 4, ring 32 may be constructed as a unitary ring or two rings halves 40 and 42. On its inner side, the ring includes a multiplicity of generally semi-circular cutouts or recesses 44 for receiving and nesting the multiplicity of clamping spools 34. As is best shown in FIG. 3, the ring 32 has an axial thickness about equal to the axial length of the spools and includes cutouts 44 to receive the spools. Further, the ring includes a multiplicity of radially oriented threaded holes 45 for receiving bolts 46 which have heads 48 accessible from the outer periphery of the ring and another end 50 which extends into the corresponding ring cutout 44. Further, spring clips 52 are secured, e.g. bolted, to the ring between adjacent cutouts. Each spring clip 52 has a sufficient length so that its ends extend into the adjoining cutouts.

A typical clamping spool 54 is illustrated in FIGS. 2 and 3. The central shank or hub portion 56 has a diameter smaller than the circumferential width of the cutouts so that the shank portion of the clamping spool may reside within the cutout 44. The clamping spool 54 comprises in addition to the central shank 56, rim portions 58 and 60 at opposite ends of the shank. The perimeter of the rims of the spool 54 extend generally around an arc of less than 360° so that at least one portion of each rim perimeter is a generally flat surface, such as surfaces 62 and 64. The flat surfaces 62 and 64 of the rims are tangential to the shank so that there exists a straight edge 66 which extends the entire axial length of the spool. The rims 58 and 60 of the clamping spool 54 defind opposing clamping faces 68 and 70 which diverge radially outward from the shank 56 and which are tapered complementary to the flange back sides 24 and 26. The clamping spool 54 has a bolt head 59 secured thereto to facilitate rotation of the clamping spool within the cutout. In order to improve the durability and strength of the connector, especially when it is used to fasten pipes which must be frequently and disconnected, the clamping spools are preferably constructed of carbon steel.

Connector 32 is assembled as follows. The spools 34 are placed in their respective cutouts on the ring by nesting the spool shank of each spool in the assigned cutout When the shank is fully disposed within the cutout the ends of the two spring clips which protrude into the particular cutout bias the shank and therewith the spool as a whole in a radially outward direction against the semi-circular bottom of the cutout. In this manner the spools are retained to the ring, yet they can be moved radially inward by tightening the bolts to the desired extent. However, when the bolts are backed up or loosened the spring clips bias the spools back into the cutout.

Connector 32 constructed in accordance with the present invention is used as follows. Initially all spools are rotated so the flat surfaces 62 and 64 and therewith straight edge 66 face radially inward. It will be observed that with the spools so oriented both the shank 56 of the spool and the flat surfaces 62 and 64 are radially outward of the inner wall 74 of the ring so that the ring can be slipped over the pipe flanges 14 and 16 by moving the connector in an axial direction along the pipes.

Next the pipe flanges are axially aligned by tightening at least three bolts which are equally spaced around the ring, e.g. by approximately 120°, so as to produce generally triangulated forces. The tightening of these three bolts causes a radially inward movement of the three spools so that the spool shanks of those spools, and specifically their straight edges 66, engage the pipe flange peripheries 36 and 38. The tightening of these three bolts is continued until the pipe flange peripheries and therewith the pipes are in axial alignment.

Next the remaining spools are rotated until the clamping faces of the spools, such clamping faces 68 and 70 of spool 54, are oriented radially inward, i.e. towards the flanges 14 and 16. These remaining spools, having been so oriented, are then moved radially inward by means of the bolts associated with each of them. The bolts are tightened so that the spools are moved radially inward and the clamping faces 68 and 70 overlap the back sides 24 and 26 of the axially aligned flanges. Because the flange back sides are tapered to converge radially outward, the radial forces produced by the bolts and transferred to the clamping faces of the spools generate axial forces on the back sides of the flanges. Referring to FIG. 2, clamping faces 68 and 70 generate oppositely directed axial forces which urge the flanges 14 and 16 into secure contact with one another at their mating faces 18 and 20. Because the spools are independently movable by their respective bolts, each spool can be moved radially a greater or lesser distance than corresponding spools, depending upon the axial thickness of the flanges and surface irregularities of the flange back sides at the point where the clamping faces overlap the flange back sides.

After the remaining spools have been moved radially inward to clamp the flanges, the first three clamping spools which were used to align the pipes are withdrawn radially outward. This is accomplished by loosening the bolts associated with the three spools, thereby permitting the spring clips associated with those spools to return the spools radially outward within their cutouts. These three spools are then rotated until the clamping faces are pointed toward the flanges, after which the three bolts are again tightened, thus moving the three clamping spools towards the flanges to complete the clamping process.

As a final step, a torque wrench may be used to assure that equal radial forces are applied to the spools, thereby assuring that generally equal axial clamping forces are applied around the circumference of the mated flanges. Thus adverse bending moments and stresses about the ends of the pipes are avoided.

When it is desired to remove the connector, all of the bolts are backed off. The spring clips 52 secured to the radially inner wall 74 of the ring 32 intermediate adjacent cutouts 44 now bias the spools radially outward until the shanks rest in the semi-circular bottoms of the cutouts. Each of the spools is then rotated, e.g. by using a wrench to grip the bolt head 59 on the clamping spool, until flat surfaces 62 and 64 of the clamping spools are again oriented radially inward. With the spools in such an arrangement and recessed within the cutouts, the connector may be moved axially away from the pipe flanges 14 and 16 without obstruction.

The simplest construction of the connector is a unitary ring. Since the spools are rotatable so that the rims 58 and 60 may be oriented radially outwardly, and since the spool shanks 56 may be made to reside against the semi-circular bottoms of the cutouts 44, the single-piece ring is easily slipped over the flanges 14 and 16. An alternative construction of the ring 32 is as a split ring comprising two semi-circular ring halves 40 and 42 which are hingedly connected. This embodiment of the connector is especially suitable for use with long pipes since the two ring halves 40 and 42 may be opened about the hinge and then closed directly over the flanges 14 and 16, without the necessity of slipping the connector over one end of a pipe. The ring 32 is constructed of two ring halves 40 and 42, as shown in FIG. 1. In such a construction, first ends of the ring halves 40 and 42 are hingedly connected with a pin 76 while the other ends of the ring halves are releasably secured to each other with a bolt 78, a clamp (not shown), or the like. In this embodiment the ring is used by opening the two halves, placing them over the pipe flanges and thereafter closing them by pivoting the halves about pin 76 and bolting the other ends of the ring halves to each other. The further steps of aligning the pipe ends and securing them to each other with the clamping spools is as above described.

Because the connector may be subjected to the atmosphere for an extended time period, it is desirable to provide means for preventing the corrosion of the connector, and especially the movable parts, such as the spools and bolts. Thus each of the bolts 46 has associated with it a sealed space 80 between the bolt head 48 and the threaded portion of the bolt for retaining a lubricant. Referring to FIG. 4, the space 80 contains a lubricant such as grease. The lubricant is sealed therein by means of an "O" ring 82 which is secured to the bolt head 48. The "O" ring seal and the grease prevent entry of water and other contaminants into the threaded hole, thereby preventing the bolts from becoming stuck within the holes. When the bolts are loosened the threads of the bolts will pick up a portion of the grease or lubricant in the space and carry that grease back into the threaded holes of the ring when the bolts are subsequently tightened.

While the invention as thus described comprises clamping spools which have opposing clamping faces separated by a constant distance around the entire rim perimeter and in which the taper of these opposing clamping faces is also relatively constant, other embodiments of the invention permit the connector to accommodate flanges of varying size and thickness.

In one such embodiment a clamping spool 84 has three pairs of opposing clamping faces arranged in sectors around the rim perimeters, as shown in FIG. 5. Each pair of clamping faces, such as opposing clamping faces 86 and 88, are machined in such a manner so as to accommodate pipe flanges of a particular axial thickness. The sector adjacent the clamping faces 86 and 88, namely the sector comprising clamping faces 90 and 92, is capable of accommodating flanges thicker than those for which faces 86 and 88 are designed. Similarly, at the next adjacent sector, the rims of spool 84 define opposing clamping faces 94 and 96 which are capable of accommodating pipe flanges even thicker than those for which the clamping faces 90 and 92 are designed. The spool 84 is thus capable of accommodating three different thicknesses of flanges. While the taper of all of the six clamping faces of spool 84 are shown in FIG. 5 as diverging from the spool shank at the same angle, it should be apparent that the clamping faces could diverge at any desired angle so as to accommodate flange back sides of different angular tapers. By providing a plurality of clamping spools such as spool 84 on the ring, a single ring is thus capable of clamping flanges of different axial thickness and back side angular taper. While three specific pairs of clamping faces are shown on spool 84, more or less than three pairs of clamping faces could be provided as desired. If the connector 32 is provided with a multiplicity of spools, such as spool 84, it operates in generally the same manner as above described. Prior to moving the spools radially inward for clamping the flanges, however, the spools must be rotated so that the proper rim sector, and thus the proper pair of clamping faces, is oriented toward the flanges.

Referring to FIG. 6, another embodiment of the invention comprises a tapered spool 98 in which the rims at the opposite ends of the shank define opposing clamping faces which vary in axial separation with position on the rim perimeter. The tapered spool 98 has rims 100 and 102 which define opposing clamping faces 104 and 106. The tapered spool 98 provides continuous opposing clamping faces 104 and 106 which gradually change in axial separation with the angular location on the perimeter of the spool. The tapered spool is preferably designed so that the clamping faces 104 and 106 diverge from the shank at the same angle regardless of the position on the shank perimeter where that angle is measured. Thus the only variation with the clamping faces is the axial distance between them. Such a tapered spool is designed to accommodate flanges of one specific back side angular taper but different axial thicknesses. When the connector is provided with a multiplicity of tapered clamping spools, such as spool 98, the operation of the connector is essentially as above described. However, prior to moving the tapered spools radially inward, the spools are rotated so that the portion of the rim perimeters oriented towards the flanges is that portion where the clamping faces are axially separated by a distance generally equal to the axial thickness of the mated flanges.

The invention as thus described and shown in the drawings is directed to clamping pipes, tanks and vessels having flanges with tapered back sides, such as back sides 24 and 26. With only slight modifications the present invention is also capable of clamping pipes having flanges with flat back sides. Referring to FIG. 8, the clamping of pipes having flanges with flat back sides 108 and 110 is accomplished by providing wedge segments 112 and 114 for the respective flat back sides. The wedges 112 and 114, which are angularly shaped so as to complement the shape of the opposing clamping faces of the spools, are rigidly secured, e.g. welded, to the flat flange back sides at points around the circumference where the spools are to overlap the mated flanges. Wedge 112 and 114 are required for each clamping spool of the connector. The wedges are angularly spaced around the flange circumference the same as the angular spacing of the spools 34 on the ring 32. The use of the connector for clamping flat flanges with wedges 112 and 114 secured to the back sides is as above described, with one exception. After the connector has been placed over the flanges and axially located so as to lie generally in the plane of the mating faces 111 and 113, the connector is rotated until each of the clamping spools is angularly aligned with a corresponding pair of wedges.

The connector with the multiplicity of clamping spools retained thereon provides axial clamping forces to the flanges at a discrete number of points around the circumference of the flanges, i.e. at those specific points where the clamping faces of the spools overlap the back sides of the flanges. Accordingly, the amount of total clamping surface contacting the back sides of the mated flanges is minimized, thereby reducing the likelihood that the clamping spools and thereby the ring will become stuck to the flanges because of rust or corrosion. To further reduce this likelihood grooves may be cut in the flange back sides in an intersecting pattern and lubricant placed in the grooves prior to clamping. Referring to FIG. 7, the lubricant is retained in the intersecting grooves 116 and will be generally permanently retained therein when the flange back sides are overlapped by the clamping faces of the spools. In order to further prevent corrosion and to increase the durability of the connector, the spools may be constructed of high-strength material such as carbon steel, and may be made corrosion resistant.

While the present invention has thus far been described in use with pipes, such as pipes 10 and 12, the connector may be adapted for use with any type of vessel, such as tanks or fluid enclosures having removable covers in which the cover is hinged relative to the tank portion to facilitate opening and closing the cover. Referring to FIGS. 9 and 10, in an alternative embodiment the connector securely fastens a generally flat cover 120 to a tank 118. Both the cover 120 and the tank 118 are pipes of the type above discussed in that they have outwardly protruding flanges 135 and 129 with mating faces 119 and 121 and tapered back sides 123 and 125. The connector is essentially identical to the above-discussed invention and comprises a ring 124 and a plurality of rotatable clamping spools 127. An annular mounting plate 122 is oriented in a plane generally parallel to the flange 129 of the tank 118 and rigidly secured, e.g. welded, to the tank 118 at an axial position behind the flange 129. The ring 124 of the connector is preferably rigidly secured, such as by welds, to the mounting plate 122, but may merely rest on the mounting plate 122, e.g. when the tank axis is oriented vertically. The annular mounting plate 122 is axially positioned on the tank 118 so that the ring 124 and thus the connector lies generally in the plane of the flange mating faces 119 and 121.

The ring 124 and the cover 120 are hingedly connected to one another so that the cover 120 may be easily opened and closed over the open end of the tank 118. The ring 124 which is preferably rigidly secured to the annular mounting plate 122 has radial extensions 131 and 132 with openings for the receipt of a hinge pin 130. The cover 120 has brackets 126 and 128 welded to the upper surface which extend beyond the flange 135 of the cover and which also have openings for the receipt of a hinge pin 130. Thus the alignment of the openings in the brackets 126 and 128 of the cover 120 with the openings in the radial extensions 131 and 132 of the ring 124 and placement of the hinge pin 130 through these aligned openings permits hinged movement of the cover 120 with respect to the ring 124 and thus the open end of the tank 118. When the cover 120 is moved about the hinge pin 130 so as to close the cover 120 over the tank 118, the peripheries of the flanges 135 and 129 are in axial alignment, thereby eliminating the necessity of initially axially aligning the flanges. Of course, if the ring 124 and the hingedly connected cover 120 merely rest on the annular mounting plate, e.g. when the tank axis is vertical, the flanges 135 and 129 would be initially axially aligned by means of three of the clamping spools 127 in the manner previously discussed.

In use, this embodiment of the invention operates essentially in the manner as previously described. That is, if the cover 120 is open and it is desired to securely fasten the cover 120 to the tank 118, the bolts 137 are backed off, thereby permitting the spring clips (not shown) to force the spools 127 against the bottoms of the cutouts (not shown). The spools 127 are then rotated so that the rims 139 are oriented radially outward. The cover 120 is then moved about the hinge pin 130 axis to close the cover. Because all portions of the spools 127 reside radially outward of the periphery of the flange 135 on the cover 120, the cover passes over the connector without obstruction. The mating faces 119 and 121 of the flanges 135 and 129 are now abutted. The spools 127 are rotated to orient the rims 139 radially inward and the bolts 137 are tightened to force the rim clamping faces radially inward to thereby generate axial clamping forces to the flanges. When it is desired to open the cover the bolts 137 are backed off and the spools 127 are rotated so that the rim clamping faces are again oriented radially outward, thereby permitting the flange 135 and the cover 120 to pass over the spools 137 and the connector without obstruction when the cover 120 is rotated about the hinge pin 130 axis. This embodiment of the invention thus permits frequent making and breaking of pipe flange connections to be accomplished with ease.

While the preferred embodiments of the present invention have been illustrated in detail, it should be apparent that modifications and adaptations of those embodiments will occur to those skilled in the art. However, it is to be expressly understood that such modifications and adaptations are within the sphere and scope of the present invention as set forth in the following claims.

What is claimed is:

1. Apparatus for securing to each other and sealing open ends of generally tubular pressure vessels fitted with radially outwardly protruding end flanges having back sides which face away from each other, the apparatus comprising: a plurality of clamping spools each having a shank and a rim protruding radially outward from each shank end, the rims defining opposing faces dimensioned for placement over the flanges and overlapping the back sides; a spool retaining ring having an inner diameter greater than an outer diameter of the flanges for placement thereover, the ring including means for receiving the spools and for positioning the spools between the ring and the flanges when the former is placed over the latter; means for movably connecting the spools to the retaining ring so that the ring and the spools can be placed as a unit into radial alignment with the flanges; means for moving the spools towards the flanges and for subjecting the spools to a force acting in the same direction; and means for establishing firm contact between the rims and the flanges and for generating a force with each spool which acts on the respective back sides of the flanges in opposite, axial directions so as to secure the flanges and therewith the vessels together and establish a seal between the vessels.

2. Apparatus according to claim 1 including gasket means disposed between the vessels.

3. Apparatus according to claim 1 wherein the axial force generating means is defined by a radially outwardly converging, angular inclination between the flange back sides and a corresponding angular inclination between the opposing faces of the spool rims.

4. Apparatus according to claim 1 wherein said connecting means further comprises a plurality of springs interposed between adjacent spools and contacting the shank portions of the spools for retaining said spools in said spool receiving means.

5. Apparatus according to claim 1 wherein the means for moving the spools towards the flanges and for subjecting the spools to a force acting in the same direction comprises means for independently moving and applying such force to each spool.

6. Apparatus according to claim 5 wherein the independent moving and force applying means comprises a radially oriented bolt for each spool, said bolt being threaded into the ring for engaging and moving the spool with the bolt.

7. Apparatus according to claim 6 wherein the bolts include generally cylindrical, enlarged diameter heads disposed within correspondingly dimensioned enlarged diameter holes in the ring, and including gasket means for sealing a space between a threaded portion of each bolt and the corresponding head.

8. Apparatus according to claim 7 including a lubricant disposed in the space.

9. Apparatus according to claim 1 wherein said spool retaining ring further comprises two generally semicircular ring segments and means for securing said ring segments to one another so as to form said spool retaining ring.

10. Apparatus according to claim 1 wherein said spool retaining ring is rigidly secured to one of said tubular pressure vessels proximate the end flange.

11. Apparatus according to claim 1 wherein one of said tubular pressure vessels is a closure member and wherein said spool retaining ring is rigidly secured to the other tubular pressure vessel proximate its end flange and including hinge means connecting said spool retaining ring to said closure member for positioning the end flange of said closure member with the end flange of the other tubular pressure vessel.

12. Apparatus according to claim 1 wherein the spools are constructed of a material having a strength which exceeds the strength of the ring.

13. Apparatus according to claim 12 wherein the spools are constructed of a corrosion resistant material.

14. Apparatus according to claim 13 wherein the ring is constructed of carbon steel.

15. Apparatus according to claim 1 wherein the shank has a cylindrical configuration; and wherein the rims are rim segments extending over an arc of less than 360°, the rim segments being further shaped so that at at least one point they do not radially protrude beyond the shank.

16. Apparatus according to claim 15 wherein the opposing faces of said rim segments are tapered in a circumferential direction so that the axial distance between said opposing faces varies with circumferential distance around the arc of said rim segments.

17. Apparatus according to claim 15 wherein said rim segments further define a plurality of rim sectors, each of said sectors defining opposing faces and wherein the axial distance between the opposing faces of any one sector is different than the axial distance between the opposing faces of said other sectors.

18. Apparatus according to claim 15 wherein the inner diameter of the ring is defined by a generally cylindrical wall; wherein the ring further includes a cutout for each spool in the cylindrical wall, the cutout extending radially outwardly of the wall and having an effective depth at least about as large as the shank diameter; and wherein the spools are disposed within the cutouts; and further including means for retaining the spools in the cutouts to the ring; whereby the ring including the spools can be slipped over the flanges as a unit when the rim segments face in a radially outward direction and said points on the spools face in a radially inward direction.

19. Apparatus according to claim 18 including means for rotating each spool about its axis for overlapping the rim segments with the flange back sides after the ring-spool unit has been slipped over the flanges.

20. Apparatus according to claim 19 wherein the means for moving the spools radially inward includes means supported by the ring for applying the radially inwardly acting force to the spools.

21. Apparatus for axially aligning and securing to each other a pair of open-ended tubular members, each member having a radially outwardly protruding end flange, each flange having a relatively flat mating face at the outermost end of the tubular member and a back side having a generally conical shape so that when the mating faces of the tubular members contact one another the back sides of the flanges generally converge radially outwardly towards one another, the apparatus comprising: a plurality of clamping spools each having a generally cylindrical hub and rim segments at each end of said hub and extending radially outwardly from the hub, said rim segments defining opposing clamping faces and having an outer periphery extending over an arc of less than 360°, said rim segments being shaped so that there is at least one point where the rim segments do not protrude radially outwardly beyond the hub; a ring for retaining said spools, said ring having an inner diameter greater than an outer diameter of the flanges and a plurality of circumferentially spaced cutouts, said cutouts having a circumferential width at least as great as the diameter of the hubs of said spools; means for movably connecting said spools to said ring at said cutouts; means for rotating said spools so as to orient the clamping faces of said rim segments radially inward; and means for independently moving each of said spools radially inwardly so as to contact the opposing clamping faces of said rim segments with the back sides of the flanges thereby generating oppositely directed axial forces to the flanges for sealing the tubular members to one another.

22. Apparatus according to claim 21 wherein said ring has a plurality of radially aligned threaded holes, each of said holes defining a passage from a respective cutout to the radially outer periphery of said ring and wherein said moving means further comprises a like plurality of threaded bolts, each of said bolts being threaded into a respective hole.

23. Apparatus according to claim 22 wherein the bolts include generally cylindrical, enlarged diameter heads disposed within correspondingly dimensioned enlarged diameter holes in the ring, and including gasket means for sealing a space between a threaded portion of each bolt and the corresponding head.

24. Apparatus according to claim 23 including a lubricant disposed in the space.

25. Apparatus according to claim 21 wherein said ring has a circumferential groove on its radially inner face and wherein said connecting means further comprises a plurality of spring devices located within said groove intermediate adjacent cutouts, said spring devices contacting the hubs of said spools thereby movably securing the spools within the cutouts.

26. Apparatus according to claim 21 wherein the rim segments of each of said spools further comprise a plurality of pairs of rim sectors, each pair of rim sectors further defining a pair of opposing clamping faces wherein the axial distance between the opposing clamping faces of any one pair of rim sectors is different than the axial distance between the opposing clamping faces of the other of said pairs of rim sectors, whereby said clamping spools may accommodate flanges of different thicknesses.

27. Apparatus according to claim 21 wherein the rim segments of each of said spools further define opposing clamping faces which are tapered in a circumferential direction so that the axial distance between the opposing clamping faces varies with circumferential distance around the rim segments.

28. Apparatus according to claim 21 wherein said ring further comprises two generally semicircular ring segments and means for securing said ring segments to one another so as to form said ring.

29. Apparatus according to claim 21 wherein said ring is rigidly secured to one of said tubular members proximate the end flange of said one member.

30. Apparatus according to claim 21 wherein the spools are constructed of a material having a strength which exceeds the strength of the ring.

31. Apparatus according to claim 30 wherein the spools are constructed of a corrosion-resistant material.

32. Apparatus according to claim 31 wherein the ring is constructed of carbon steel.

33. Apparatus according to claim 21 wherein one of said tubular members is a cover member and wherein said ring is rigidly secured to the other tubular member proximate its end flange and including hinge means connecting said ring to said cover member for positioning the flange on said cover member with the flange on said other tubular member.

34. Apparatus according to claim 21 wherein the back sides of the flanges have a plurality of intersecting grooves, and including a lubricant disposed in said grooves, whereby galling of said back sides by the clamping faces of said spools is reduced.

35. Apparatus for aligning and securing open ended generally tubular pressure members having circumferential end flanges proximate the open ends and protruding radially outwardly, wherein said flanges have generally flat mating faces and radially outwardly converging back sides, the apparatus comprising:

a plurality of clamping spools each having a generally cylindrical shank and rim segments at opposite ends of said shank and protruding radially outwardly from said shank, said rim segments extending over an arc of less than 360° and being shaped so that there is at least one point where they do not radially protrude beyond the shank, the rim segments of each shank defining opposing faces which diverge radially outwardly from the shank so as to overlap the converging back sides of the mated flanges when said clamping spools are positioned so as to clamp said flanges;

a spool retaining ring having an inner diameter greater than an outer diameter of said flanges and having a plurality of cutouts equally spaced circumferentially on its radially inner face, each of said cutouts having a circumferential width at least as wide as the diameter of said shanks for receiving said clamping spools, said ring further having a plurality of threaded holes extending radially from each of said cutouts to the radially outer face of said ring;

a plurality of spring devices for movably connecting said clamping spools to said cutouts, each of said spring devices being secured to said ring proximate its radially inner face and between adjacent cutouts, said spring devices contacting the shank portions of said spools;

a plurality of threaded bolts, each of said bolts being disposed within a respective threaded hole and having a radially inwardly directed end contacting the shank portion of said spools for moving said spools radially inwardly as said bolts are tightened; and means for rotating said spools as to orient the opposing faces of said rim segments radially inwardly so as to provide axial securing forces to said mated flanges when said clamping spools are moved radially inwardly by said bolts.

* * * * *